United States Patent
Park et al.

(10) Patent No.: US 9,301,270 B2
(45) Date of Patent: Mar. 29, 2016

(54) METHOD AND APPARATUS FOR SYNCHRONIZATION FOR DEVICE-TO-DEVICE COMMUNICATION

(71) Applicant: Samsung Electronics Co., Ltd, Gyeonggi-do (KR)

(72) Inventors: Seung-Hoon Park, Seoul (KR);
Kyung-Kyu Kim, Seoul (KR);
Dae-Gyun Kim, Gyeonggi-do (KR);
Chi-Woo Lim, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 141 days.

(21) Appl. No.: 14/061,651

(22) Filed: Oct. 23, 2013

(65) Prior Publication Data

US 2014/0112332 A1  Apr. 24, 2014

(30) Foreign Application Priority Data

Oct. 23, 2012 (KR) .................. 10-2012-0117781

(51) Int. Cl.
*H04B 7/212* (2006.01)
*H04W 56/00* (2009.01)
*H04W 76/04* (2009.01)
*H04W 76/02* (2009.01)

(52) U.S. Cl.
CPC .......... *H04W 56/001* (2013.01); *H04W 56/002* (2013.01); *H04W 76/046* (2013.01); *H04W 76/023* (2013.01)

(58) Field of Classification Search
CPC ............ H04W 56/001; H04W 56/002; H04W 76/023; H04W 76/046
USPC .................. 370/324, 350, 503–520; 455/502; 375/272, 354–376
See application file for complete search history.

(56) References Cited

U.S. PATENT DOCUMENTS

| 6,154,642 | A  | * | 11/2000 | Dumont et al. ............... | 455/403 |
| 2005/0041692 | A1 | * | 2/2005  | Kallstenius ................... | 370/503 |
| 2009/0135301 | A1 | * | 5/2009  | Ko et al. ....................... | 348/524 |

(Continued)

FOREIGN PATENT DOCUMENTS

| EP | 1744472 A1 | 1/2007 |
| EP | 1852998 A1 | 11/2007 |

OTHER PUBLICATIONS

International Search Report dated Jan. 28, 2014 in connection with International Patent Application No. PCT/KR2013/009467, 3 pages.

(Continued)

*Primary Examiner* — Mang Yeung

(57) ABSTRACT

A method and an apparatus for synchronization for a device-to-device communication are disclosed. The method includes: instantly adjusting a synchronization phase value according to a time point when a synchronization signal is received, as soon as a device receives the synchronization signal from an adjacent device in an unconnected state; accumulatively storing at least one phase adjustment value according to a time point when at least one synchronization signal is received, whenever the device receives the at least one synchronization signal from at least one adjacent device in a connected state; and adjusting the synchronization phase value according to the stored at least one phase adjustment value when the device transitions from the connected state to the unconnected state.

20 Claims, 15 Drawing Sheets

(56) References Cited

U.S. PATENT DOCUMENTS

2011/0261859 A1* 10/2011 Dokania et al. ............... 375/130
2012/0185434 A1* 7/2012 Giampaolo et al. .......... 707/634

OTHER PUBLICATIONS

Written Opinion of the International Searching Authority dated Jan. 28, 2014 in connection with International Patent Application No. PCT/KR2013/009467, 5 pages.

Yao-Win Hong, et al., "A Scalable Synchronization Protocol for Large Scale Sensor Networks and Its Applications", IEEE Journal on Selected Areas in Communications, vol. 23, No. 5, May 2005, pp. 1085-1099.

NTT DoCoMo, "1ST-4-027756 WINNER II D2.3.3.-v1.00, Link Level Procedures for the WINNER System", Nov. 30, 2007, 211 pages.

* cited by examiner

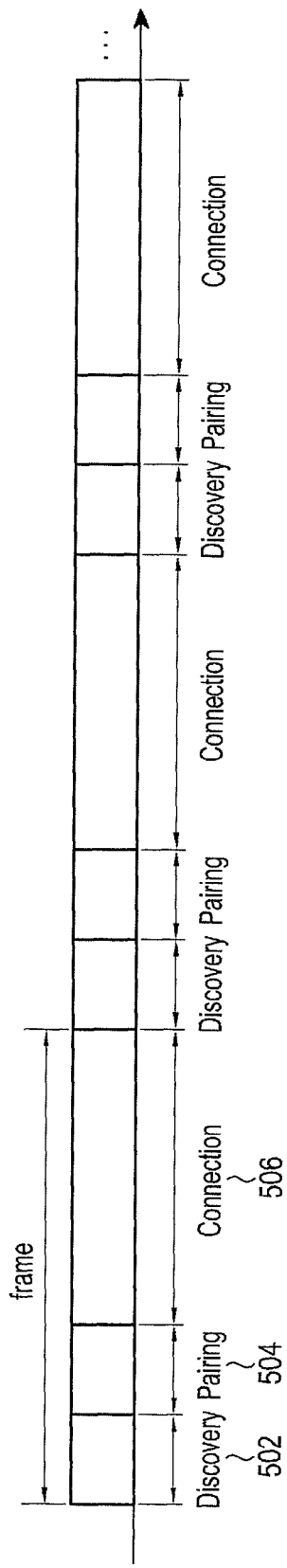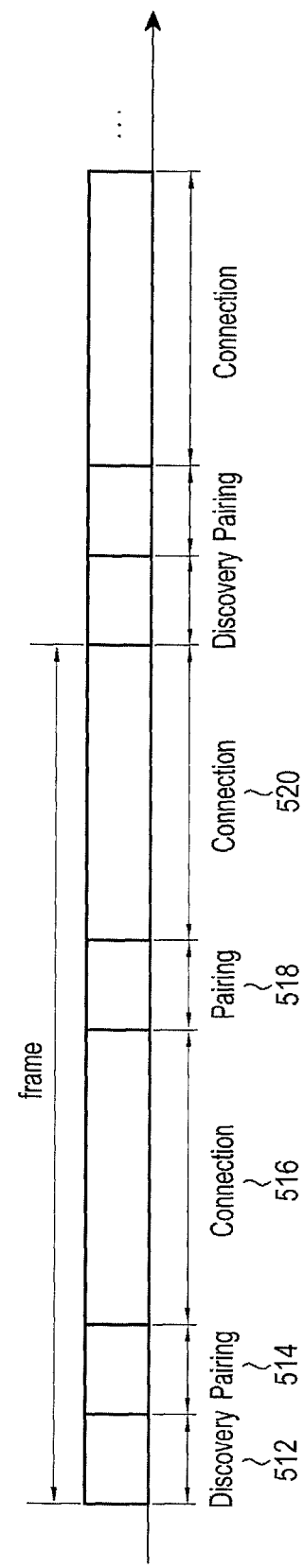
FIG.5A
FIG.5B

METHOD AND APPARATUS FOR SYNCHRONIZATION FOR DEVICE-TO-DEVICE COMMUNICATION

CROSS-REFERENCE TO RELATED APPLICATION(S) AND CLAIM OF PRIORITY

The present application is related to and claims the priority under 35 U.S.C. §119(a) to Korean Application Serial No. 10-2012-0117781, which was filed in the Korean Intellectual Property Office on Oct. 23, 2012, the entire content of which is hereby incorporated by reference.

TECHNICAL FIELD

The present disclosure relates generally to a device-to-device communication, and more particularly, to a method and an apparatus for synchronizing devices for a device-to-device communication.

BACKGROUND

With the recent development in the communication technologies, data traffic is rapidly increasing. It is expected that there will be a further increase in the number of users of smart phones, which would result in a further activation of application services using the smart phones and accordingly a further increase in data traffic. Especially, when a new mobile market beyond the inter-user communication, which includes a communication between a human and a machine and a Machine-to-Machine (M2M) communication using intelligence of a machine, is vitalized, it is expected that it will be impossible to cope with the increase in the traffic transmitted to an evolved NodeB (eNB).

Attention is being paid to a Device-to-Device communication (D2D communication) in both the licensed band of the mobile (cellular) communication and the unlicensed band, such as Wireless Local Area Network (WLAN), as a technology that can solve these problems.

It is worth paying attention to the D2D communication in that the D2D communication can increase the traffic accommodating capability of an eNB and reduce the overload of the eNB when it converges with the cell-based mobile communication. By establishing a D2D link between User Equipments (UEs) within the same cell or adjacent cells and allowing, the UEs to directly exchange data without passing through an eNB, it is possible to reduce the two links including the eNB to only one link.

Research in the unlicensed band are intended to recognize requests generated by a human-to-human communication, a human-to-machine communication, and a machine-to-machine communication, prevent unnecessary waste of wireless resources, and provide a service based on a properly determined local traffic. Therefore, the research is focused on a method for efficiently operating a process of broadcasting and receiving a service and information of contents by a plurality of devices.

In order to control a communication between devices, a process of setting synchronization between the devices is required. A device sets synchronization between devices by using time information received through a Global Positioning System (GPS) reception module or from a synchronous eNB. In the case of setting synchronization between devices by using time information received through a GPS reception module or from a synchronous eNB, the device is inevitably required to access the GPS reception module or the synchronous eNB. However, the synchronous eNB may not be supported according to the communication schemes provided by communication service providers, and the device may be thus unable to set synchronization by using the time information received from a synchronous eNB. Further, when a device is located in a GPS shaded area (e.g., an area between high-story buildings, an area in a tunnel, an indoor area of a building), the device is be unable to receive time information from a GPS satellite and thus unable to set the synchronization.

As described above, when a device is unable to readily access a synchronous eNB or GPS reception module, the device is unable to even start a D2D communication.

SUMMARY

To address the above-discussed deficiencies, the present disclosure includes a method and an apparatus for synchronization between devices for a device-to-device communication.

Certain embodiments of the present disclosure include a method and an apparatus for synchronizing devices using oscillators having the same phase increase rate.

Certain embodiments of the present disclosure include a method and an apparatus for synchronization, which minimize the influence on the data exchange in a connected state in a device-to-device communication.

Certain embodiments of the present disclosure include a method and an apparatus, which use different synchronization algorithms in a connected state and an unconnected state in a device-to-device communication.

Certain embodiments of the present disclosure include a method and an apparatus, in which a device in a connected state detects an asynchrony in a device-to-device communication.

Certain embodiments of the present disclosure include a method of synchronization for a device-to-device communication including: instantly adjusting a synchronization phase value according to a time point when a synchronization signal received, as soon as a device receives the synchronization signal from an adjacent device in an unconnected state; accumulatively storing at least one phase adjustment value according to a time point when at least one synchronization signal is received, whenever the device receives the at least one synchronization signal from at least one adjacent device in a connected state; and adjusting the synchronization phase value according to the stored at least one phase adjustment value when the device transitions from the connected state to the unconnected state.

Certain embodiments of the present disclosure include an apparatus for synchronization for a device-to-device communication includes: a receiver that receives and detects a synchronization signal from at least one adjacent device; a transmitter that transmits a synchronization signal whenever a synchronization phase value reaches a predetermined maximum value; and a processor that instantly adjusts a synchronization phase value according to a time point when a synchronization signal is received, as soon as a device receives the synchronization signal from an adjacent device in an unconnected state, accumulatively stores at least one phase adjustment value according to a time point when at least one synchronization signal is received, whenever the device detects the at least one synchronization signal from at least one adjacent device in a connected state, and adjusts the synchronization phase value according to the stored at least one phase adjustment value when the device transitions from the connected state to the unconnected state.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A and 5B illustrate device-to-device communication processes according to embodiments of the present disclosure;

DETAILED DESCRIPTION

Figures 1A, 1B, 1C:
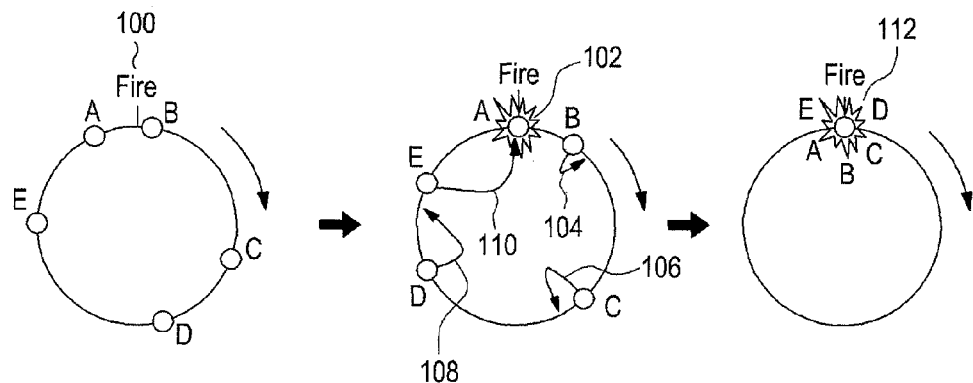
FIGS. 1A-1C illustrate an operation of synchronization using a Pulse-Coupled Oscillator (PCO) algorithm to which embodiments of the present disclosure are applied.

FIGS. 1A through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, various embodiments of the present disclosure will be described with reference to the accompanying drawings. In the following description, a detailed description of known functions and configurations incorporated herein will be omitted when it may make the subject matter of the present disclosure rather unclear. Further, terms described below are defined in consideration of the functions of the present disclosure, but may vary according to the intention or convention of a user or operator. Therefore, their definition will be made based on the overall contents of this specification.

Embodiments of the present disclosure provide operations for synchronization between devices for a device-to-device communication. Synchronization between devices without an aid of a device sending a reference time (for example, a GPS satellite or a synchronous eNB) refers to synchronization between time references of individual devices. Each device has an oscillator and sets the time reference based on the oscillator. In order to achieve an efficient exchange of a control signal and a data signal without collision between them in a D2D communication link, individual devices are required to have the same time reference and exchange the signals with the same frame structure.

At an initial stage, devices trigger oscillators at different time points and thus have different time references. For example, on a supposition that a time value of each oscillator repeatedly increases from 0 to 100. An oscillator of device A starts at an absolute time value of 10 and an oscillator of device A starts at an absolute time value of 40. Then, at an absolute time value of 50, the oscillator of device A has an oscillator value of 40 and the oscillator of device B has an oscillator value of 10. Therefore, the devices are not synchronized with each other.

The simplest method for synchronization between the devices in a network is a method in which every device notifies other devices of its oscillator value and the devices then adjust their own oscillator values. In the case of the above example, at the absolute time value of 50, device A notifies device B of the oscillator value of 40 and device B notifies device A that the oscillator value difference from its own oscillator value of 10 is 30. Then, device A can revise its own oscillator value based on the oscillator value difference to synchronize with device B.

However, when there are too many devices, it is difficult to achieve network synchronization between the devices within a predetermined time only by repeatedly performing the one-to-one operation as described above.

Information on time offset that indicates a difference of reference times (i.e., oscillator values) between devices can be transferred through a Media Access Control (MAC) message. However, various types of latencies generated during the process of encoding and sending or receiving and decoding a MAC message degrade the synchronization performance. Such latencies include an encoding latency, a propagation latency, a decoding latency, a processing latency, and a channel accessing latency. Especially, in performing resource access for contention-based MAC message transmission, a severe channel access latency due to collision is be generated. Therefore, the synchronization by the D2D communication is problematic in that, the larger the network, the larger the complexity (for operations of election and management of a representative device) and the latency. Moreover, in the synchronization by the D2D communication, it takes a long time in synchronization convergence for a dynamic D2D network in a wide area.

The embodiment of the present disclosure described below uses a synchronization signal transmitted from a physical (PHY) layer instead of the exchange of messages of a MAC layer between devices. The synchronization signal transmitted from a physical layer can have a form of, for example, a preamble, a code, or a sequence, and is designed to be restored up to a predetermined level even when it overlaps with other synchronization signals.

When a synchronization signal of a physical layer is transmitted in response to a particular event set in the device, another device receives the synchronization signal and adjusts a reference time. Then, through repetition of such adjustment by other devices, synchronization between the devices is achieved (that is, the devices have the same reference time) within a predetermined time. Since the synchronization signal transmitted from a physical layer does not include information related to the MAC layer (e.g. a device ID, time offset, etc.), each device adjusts its own reference time by using the reception time of the synchronization signal.

The Pulse-Coupled Oscillator (PCO) algorithm is one of synchronization methods using a synchronization signal of a physical layer in a device-to-device communication.

FIGS. 1A-1C illustrates an operation of synchronization using a PCO algorithm to which embodiments the present disclosure are applied. As shown in FIGS. 1A-1C, the PCO algorithm includes a firing operation and a listening operation. In FIGS. 1A-1C, each circle refers to a reference time of each device operating according to the PCO algorithm, that is, a time line of an oscillator phase value, and each small dot on each circle refers to a current reference time (i.e. current phase value) of each device.

Referring to FIGS. 1A-1C, devices A to E have oscillators having the same phase increment ratio, respectively. That is, the oscillators continuously increase the phase value according to the same phase function. Each device performs firing at a time point at which the device reaches a maximum value of its own oscillator phase (i.e. a time point at which the oscillator phase value has returned to its initial position after traveling along the circle) to transmit a synchronization signal so that other devices adjacent to the device can receive the synchronization signal. After the firing 100, the phase value is initialized to 0. The time cycle from the phase value of 0 to the maximum phase value is referred to as a PCO cycle.

In situation (a) of FIG. 1A, if there is no connectivity between devices, each device performs firing 102 (shown in FIG. 1B) at each cycle T determined by the increment ratio and maximum value of the phase. As noted from situation (a), when device A reaches a firing time point and transmits a synchronization signal, other devices receive the synchronization signal from device A and adjust their own phase values based on the received synchronization signal.

According to the PCO algorithm, devices B, C, D, and E except for device A can determine phase adjustment values 104, 106, 108, and 110 by the phase value functions possessed by themselves, respectively. For example, a relatively short time has passed after device B performed the firing, while a relatively long time has passed after device E performed the firing. Therefore, device E raises its phase value with a larger phase adjustment value than that of device B. As a result of the adjustment, each device performs the firing and returns the phase to 0 at the moment when the adjusted phase value exceeds the maximum value. As a result of repetition of the operation in situation (b) of FIG. 1B by the devices, all the devices have the same phase value as in situation (c) of FIG. 1C so as to achieve the synchronization of the network.

Figure 2:
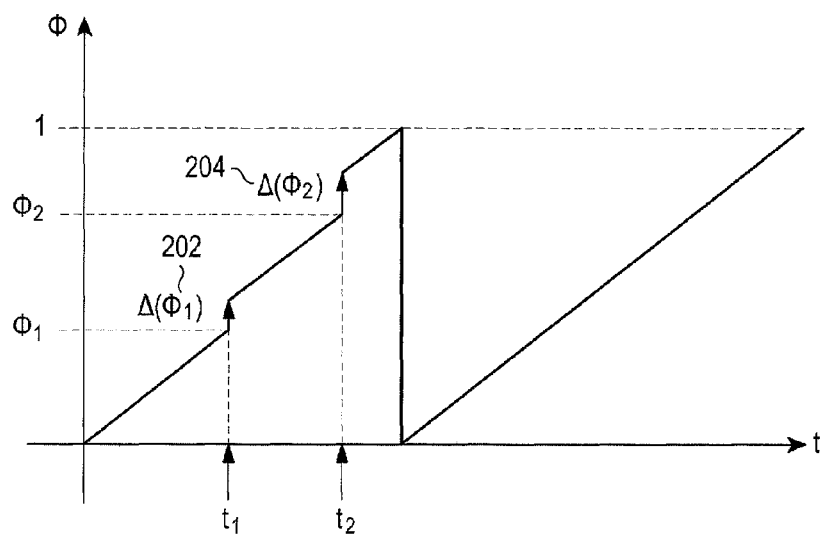
FIG. 2 illustrates adjustment of a phase value according to reception of a synchronization signal according to embodiments of the present disclosure.

FIG. 2 illustrates adjustment of a phase value according to reception of a synchronization signal.

Referring to FIG. 2, when a synchronization signal has been received from another device at time point $t_1$ and time point $t_2$, a device adjusts a phase value of an oscillator according to phase adjustment values $\Delta(\phi_1)$ and $\Delta(\phi_2)$ determined by the phase values $\phi_1$ and $\phi_2$ at the time points where the synchronization has been received. That is, the device increases its own phase value by $\Delta(\phi_1)$ in response to the reception of the synchronization signal at time point $t_1$, and increases its own phase value by $\Delta(\phi_2)$ in response to the reception of the synchronization signal at time point $t_2$.

Figure 3:
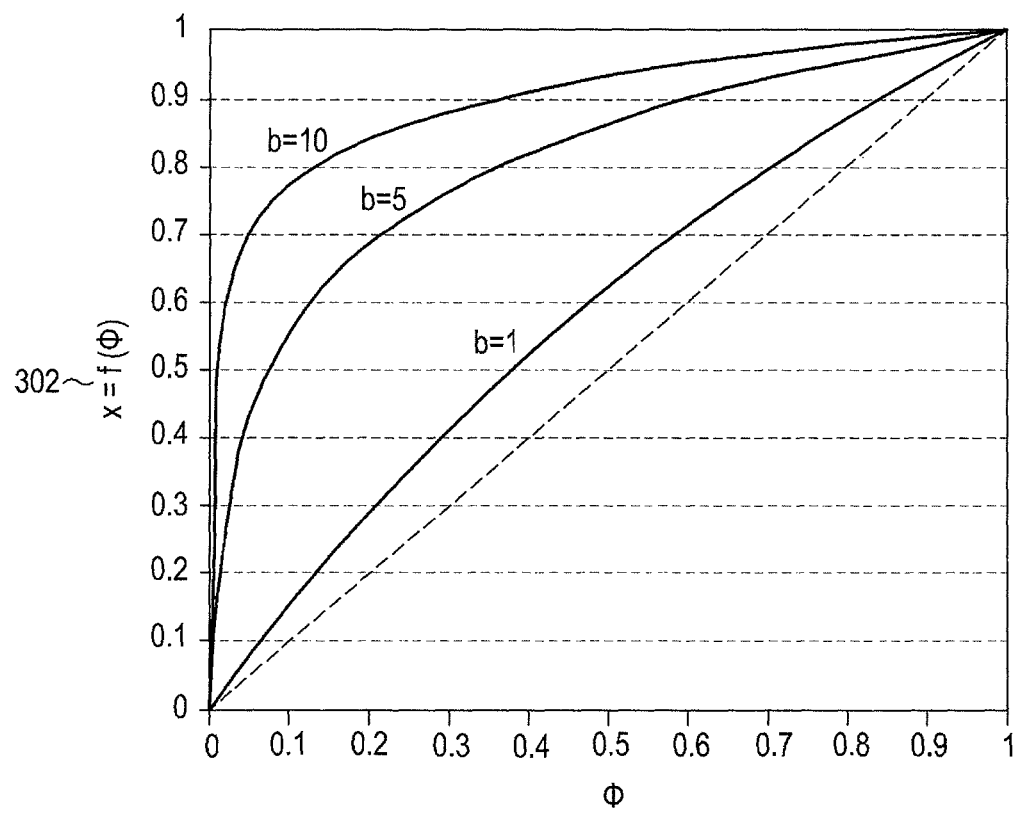
FIG. 3 illustrates a graph of a function of the phase adjustment value according to embodiments of the present disclosure.

FIG. 3 illustrates a graph of a function of the phase adjustment value. As shown, the phase adjustment value is determined by a function $f(\phi)$ 302 ($x=f(\phi)$), which is expressed by one of the curves in FIG. 3. The function $f(\phi)$ 302 ($x=f(\phi)$) can be expressed by Equation (1) below.

$$f(\phi) = \frac{1}{b} \cdot \ln(1 + [e^b - 1] \cdot \phi). \qquad (1)$$

In equation (1), b is a number that is larger than 0 and indicates the degree of curvature, wherein the curvature of a corresponding curve increases as b increases.

The phase value newly determined by the adjustment of the phase can be can be expressed by Equation (2) below.

$$\phi_{new} = \phi_{old} + \alpha(\phi) = g(\phi) = \min(1, f^{-1}(f(\phi)+\epsilon)) \qquad (2)$$

In equation (2), $\epsilon$ is a coefficient that indicates the degree of connectivity between the devices. That is, in the mathematical view, the coefficient refers to the intensity with which each device moves on the curve in response to the firing.

For example, the phase value of a device j at the time point t when the device j receives a synchronization signal from a device i is $\phi_j(t)$. Then, $\epsilon$ is added to an output value $f(\phi_j(t))$ of a function $f(\phi)$, an input value of which is the phase value, to obtain a sum, and the sum is then used as an input of an inverse function $f^{-1}(\phi)$. Then, $f^{-1}(f(\phi_j(t)))+\epsilon$ is obtained as an output value of the inverse function and corresponds to the phase adjustment value for the device j. Therefore, when a received synchronization signal has a small phase value, an offset (i.e. phase adjustment value) to the phase value to which it is to be changed is also small. In contrast, when a received synchronization signal has a large phase value, the phase adjustment value is also large.

Figure 4:
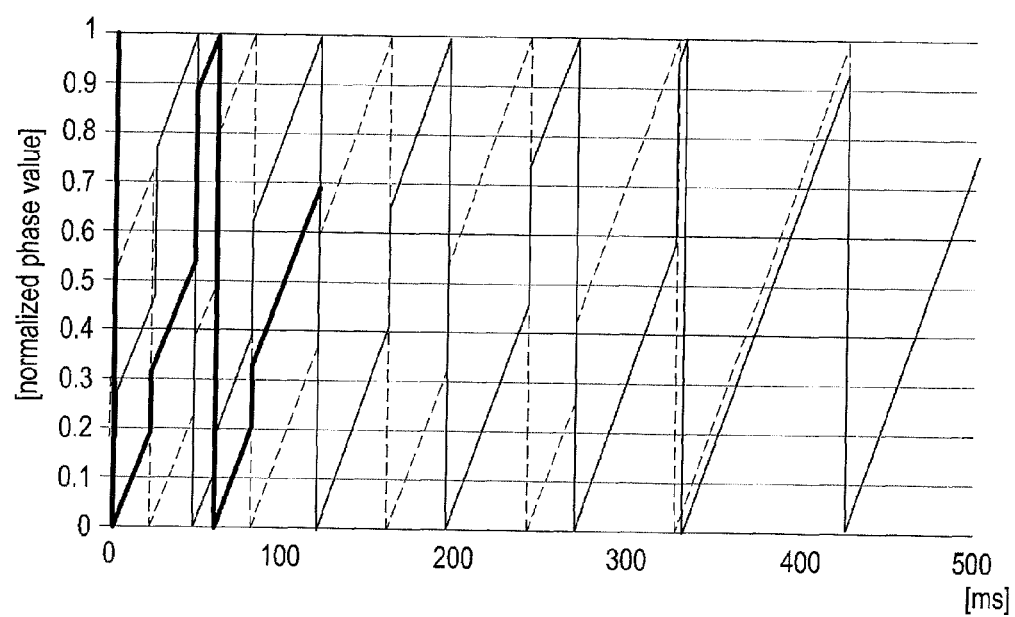
FIG. 4 illustrates a graph of changes in phase values according to a PCO algorithm according to embodiments of the present disclosure.

FIG. 4 is a graph illustrating changes in phase values according to a PCO algorithm. FIG. 4 shows convergence of phase values of 10 devices having a phase increment ratio of 1/100 milliseconds (ms). As noted, the phase values of all the devices become identical, that is, the devices are synchronized, at the time point of about 400 ms.

In the D2D communication, each device first receives service-related information broadcasted by at least one other device adjacent to the device, and then accesses the adjacent device to configure a link only when it is necessary. In order to efficiently perform this process, it is more efficient for adjacent devices to exchange service information during a predetermined interval than for every device to broadcast service information any time without a reference time. To this end, the D2D communication procedure can be configured to include a discovery operation, a pairing operation, and a connection operation.

FIG. 5A illustrates a device-to-device communication process according to embodiments of the present disclosure.

Referring to FIG. 5A, a frame for a device-to-device communication includes a discovery period 502, a pairing period 504, and a connection period 506. In the discovery period 502, service-related information is transmitted and received between adjacent devices. In the pairing period 504, a transmission device which wants communication selects a device, which has transmitted information to which the transmission device pays attention during the discovery period 502, as a reception device, transmits an intention to link to the reception device as a pair, and makes a pair with the reception device according to a response of the reception device. During the connection period 506, data is transmitted or received through one or more traffic slots between the paired transmission device and reception device.

FIG. 5B illustrates a device-to-device communication process according to embodiments of the present disclosure.

Referring to FIG. 5B, a frame for a device-to-device communication includes a discovery period 512, a plurality of pairing periods 514 and 518, and a plurality of connection periods 516 and 520 that follow the pairing periods 514 and 518, respectively. In each of the pairing periods 514 and 518, a function of managing a link established through pairing is performed in order to prepare data exchange in the following connection periods 516 and 520.

In an ad-hoc network, a contention-based resource access is used without network synchronization or a network synchronization is performed only between devices connected to the network (i.e., connection-established devices) while a contention-based resource access is used before the connection is established. For example, 802.15.4 ZigBee uses a Contention Access Period (CAP) and a Guaranteed Time Slot (GTS). As another example, although 802.11 Wireless-Fidelity (Wi-Fi) basically uses Carrier Sense Multiple Access/Collision Avoidance (CSMA/CA), which corresponds to a contention-based resource access. It can use not only the CSMA/CA, but also a non-contention-based resource access, such as polling, by using a broadcast message (e.g., beacon or probe) after connection to an Access Point (AP).

In contrast, in a device-to-device communication network, it is necessary to establish synchronization between the devices even for the discovery operation and the pairing operation which are in an unconnected state before the connection operation. Therefore, adjacent devices are required to use the same time reference in the discovery period and the pairing period.

Therefore, in the embodiment of the present disclosure described below, each device is allowed to switch its operation state between an unconnected state and a connected state. The unconnected state can be, for example, a state in which the device is in the discovery period or the pairing period. The connected state can be, for example, a state in which the device is in the connection period.

In the case of a device in an unconnected state, since the discovery period or the pairing period is very small in comparison with the entire frame period, the latency that a user can sense corresponds to only an allowable level, even though the device instantly adjusts the phase value whenever the device receives a synchronization signal from an adjacent device according to an existing PCO algorithm. However, if the device frequently changes the phase value in the connected state, much loss may occur in the traffic data being sent.

Therefore, the embodiment of the present disclosure described below applies PCO rule 2 to a device in a connected state, although it applies PCO rule 1 according to the same PCO algorithm as the existing algorithm to a device in an unconnected state.

According to PCO rule 2, a device does not instantly adjust a phase value as soon as it receives a synchronization signal from an adjacent device. Instead, the device accumulatively stores time points (or phase adjustment values according to the time points) when synchronization signals are received, and collectively performs phase value adjustments corresponding to all the synchronization signals received during a connection period when the connection period is over.

Figure 6:
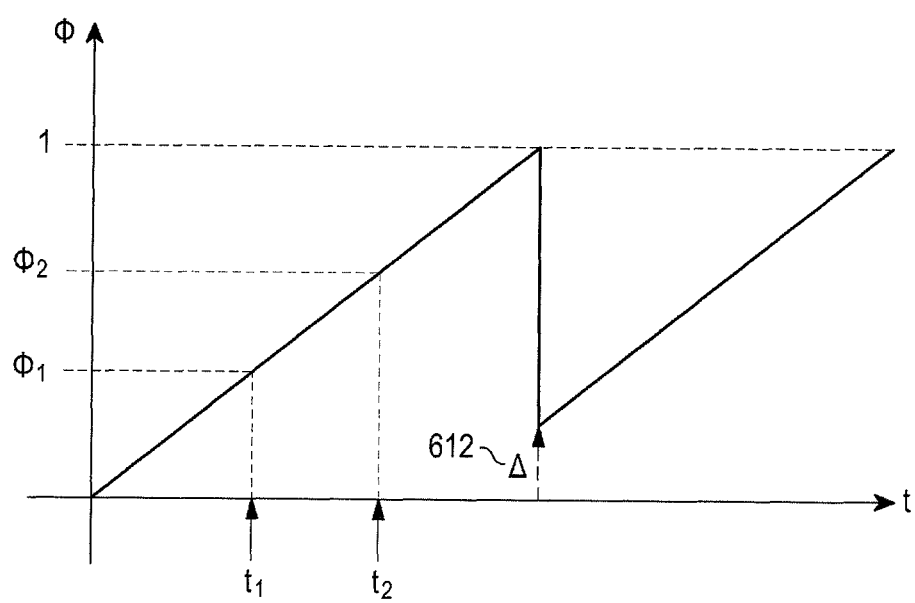
FIG. 6 illustrates a graph of phase adjustment in a connected state according to an embodiment of the present disclosure.

FIG. 6 is a graph illustrating phase adjustment in a connected state according to embodiments of the present disclosure. A device operating according to PCO rule 2 does not adjust the phase value even when synchronization signals are received from adjacent devices at time points $t_1$ and $t_2$ and accumulatively stores phase adjustment values calculated based on the time points. At time point $t_3$, at which a predetermined connection period (for example, period 506 of FIG. 5A or period 516 or 520 of FIG. 5B) expires, the device collectively adjusts its own phase value based on the accumulated phase adjustment values A 612. The synchronization operation according to PCO rule 1 is as illustrated in FIG. 2.

In comparison with the graph of FIG. 2, the phase value after the adjustment in FIG. 6 is identical to the phase value at the corresponding time point of FIG. 2. Therefore, even when both PCO rule 1 and PCO rule 2 are simultaneously operated, the network synchronization can be converged within a predetermined time.

Figure 7:
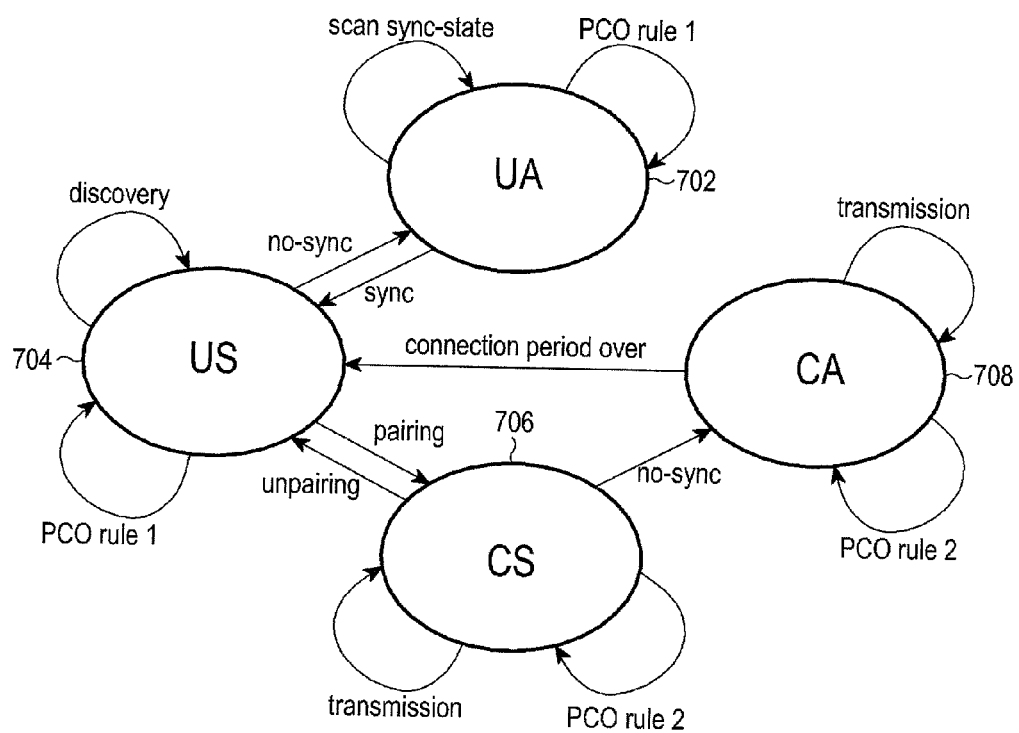
FIG. 7 illustrates a state transition in a device-to-device communication according to embodiments of the present disclosure.

FIG. 7 illustrates a state transition in a device-to-device communication according to embodiments of the present disclosure.

Referring to FIG. 7, states of a device-to-device communication include an Unconnected & Asynchronous state (UA) state 702, an Unconnected & Synchronous state (US) state 704, a Connected & Asynchronous state (CA) state 708, and a Connected & Synchronous state (CS) state 706. Devices in the UA state 702 and the US state 704 perform synchronization operations according to PCO rule 1. Devices in the CS state 706 and the CA state 708 perform synchronization operations according to PCO rule 2.

In the UA state 702, a device performs a scan sync-state operation to determine whether synchronization with adjacent devices has been acquired during a predetermined time period (i.e., PCO cycle). If two or more synchronization signals are received during one PCO cycle, the device determines that synchronization with adjacent devices which have been already operating has not been acquired, and joins PCO rule 1 while transmitting a synchronization at a predetermined time point.

In the case of joining PCO rule 1, if another synchronization signal is not received during one PCO cycle while the device performs a synchronization operation, the device determines that synchronization with adjacent devices has been acquired. If only one synchronization signal is received during one PCO cycle while the device performs scanning before joining PCO rule 1, the device sets the phase value to 0 at the time point when the synchronization signal is received and determines that synchronization with adjacent devices has been acquired.

If the device determines that synchronization with adjacent devices has been acquired, the device transitions from the UA state 702 to the US state 704 and performs a discovery operation. In this event, when the device reaches a phase value corresponding to a start time point of a discovery period in a predetermined frame structure after sending, a synchronization signal, the device starts the discovery period. In the case of the pairing period or the connection period also, the start of the period can be detected based on the phase value according to the frame structure.

If a peer device related to the service is found through the discovery operation, the device performs a pairing operation in order to configure a connection link. When the pairing operation is completed, the device establishes connection with the peer device, transitions to the CS state 706, and starts to perform synchronization according to PCO rule 2. In the CS state 706, the device starting to perform synchronization according to PCO mile 2 may perform the firing operation at the maximum phase value without performing the listening operation of receiving another synchronization signal.

In the CS state 706, if the device determines, based on a predetermined scheme, that synchronization is not acquired, the device transitions to the CA state 708. The predetermined scheme for the determination that synchronization is not acquired may include, for example, a method of recognizing an increase of a packet error rate or a method of listening for a synchronization signal from another device for a predetermined detection period. In the CA state 708, the device performs synchronization according to PCO rule 2 by listening for synchronization signals from adjacent devices during a time interval for which traffic transmission or reception is not performed in the connection period. When the predetermined connection period is over, the device transitions from the CA state 708 to the US state 704.

According to a selectable embodiment of the present disclosure, when one or more synchronization signals according to firing of adjacent devices are detected during a predetermined oscillation cycle in a scanning period in which a device operates without transmitting a synchronization signal for initial joining to a device-to-device (D2D) network, the device determines that an asynchrony has been detected. According, to another selectable embodiment of the present disclosure, when at least two synchronization signals from adjacent devices are detected during a synchronization process in which a device operates while transmitting a synchronization signal, the device determines that an asynchrony has been detected.

Figure 8:
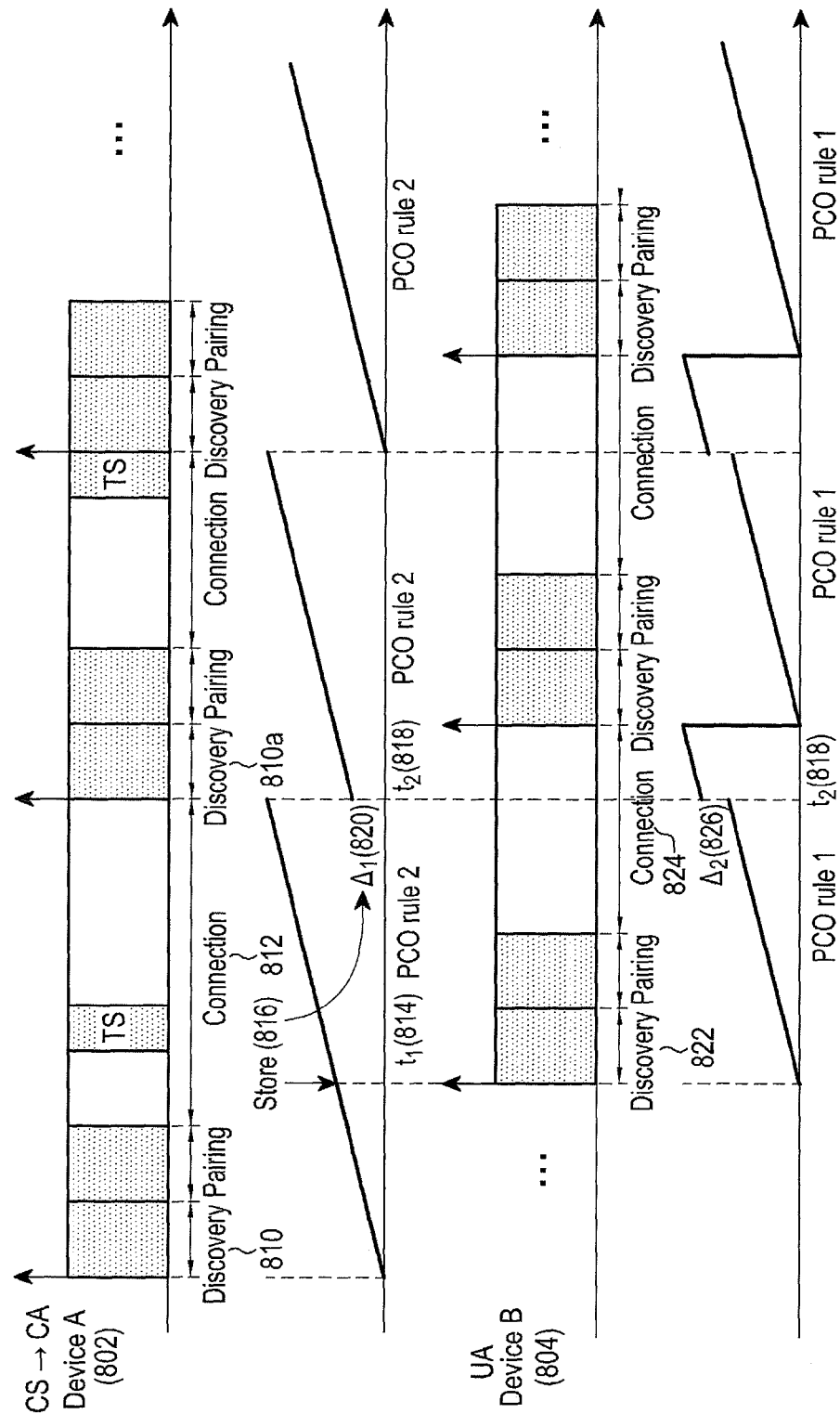
FIG. 8 illustrates an example of a synchronization operation according to embodiments of the present disclosure.

FIG. 8 illustrates an example of a synchronization operation according to embodiments of the present disclosure. In FIG. 8, reference numeral 802 indicates a synchronization operation of device A that has transitions from the CS state to the CA state and reference numeral 804 indicates a synchronization operation of device B in the UA state.

Referring to FIG. 8, the phase value of device A 802 is initialized at the start point of a discovery period 810, and device A 802 starts a synchronization operation according to PCO rule 2 while entering a predetermined connection period 812. During the operation according to PCO rule 2, device A 802 receives a synchronization signal from device B 804, which is adjacent to device A 802 and starts a discovery period 822, at a time point $t_1$ 814, and calculates and stores (as indicated by reference numeral 816) a phase adjustment value $\Delta_1$ 820 corresponding to the time point $t_1$ 814 at which the synchronization signal is received. The phase adjustment value is not instantly reflected in the phase value of the device A 802 but is reflected at the time point $t_2$ 818 at which the connection period 812 expires. In other words. at the time point $t_2$ 818, at which the connection period 812 expires, device A 802 adjusts its own phase value by the phase adjustment value 820 accumulated by at least one synchronization signal received during the connection period 812. Although the adjustment of the phase value is actually performed through a predetermined processing, such as reading of a stored phase adjustment value, after the time point $t_2$ 818, a detailed description of the processing time is omitted here. When a next discovery period 810a starts, device A 802 initializes the phase value and transmits, i.e., broadcasts, a synchronization signal for synchronization operations of adjacent devices.

According to certain embodiments, device A 802 stores only information on the time point $t_1$ 814, at which the synchronization signal is received ,and collectively calculates the accumulated phase adjustment values at the time of termination of the connection period.

Since device B 804 is in an unconnected state, device B 804 does not perform data transmission or reception during the connection period 824 and performs a synchronization operation according to PCO rule 1. When a synchronization signal is received from device A 802, starting the discovery period 810a at the time point $t_2$ 818, device B 804 calculates a phase adjustment value $\Delta_2$ 826 corresponding to the time point $t_2$ 818 at which the synchronization signal is received and instantly reflects the calculated phase adjustment value in its own phase value. In other words, device B 804 adjusts its own phase value based on the calculated phase adjustment value 826 at the time point $t_2$ 818. Although the adjustment of the phase value is actually performed through a predetermined processing, such as calculation of the phase adjustment value, after the time point $t_2$ 818, a detailed description of the processing time is omitted here.

Figure 9:
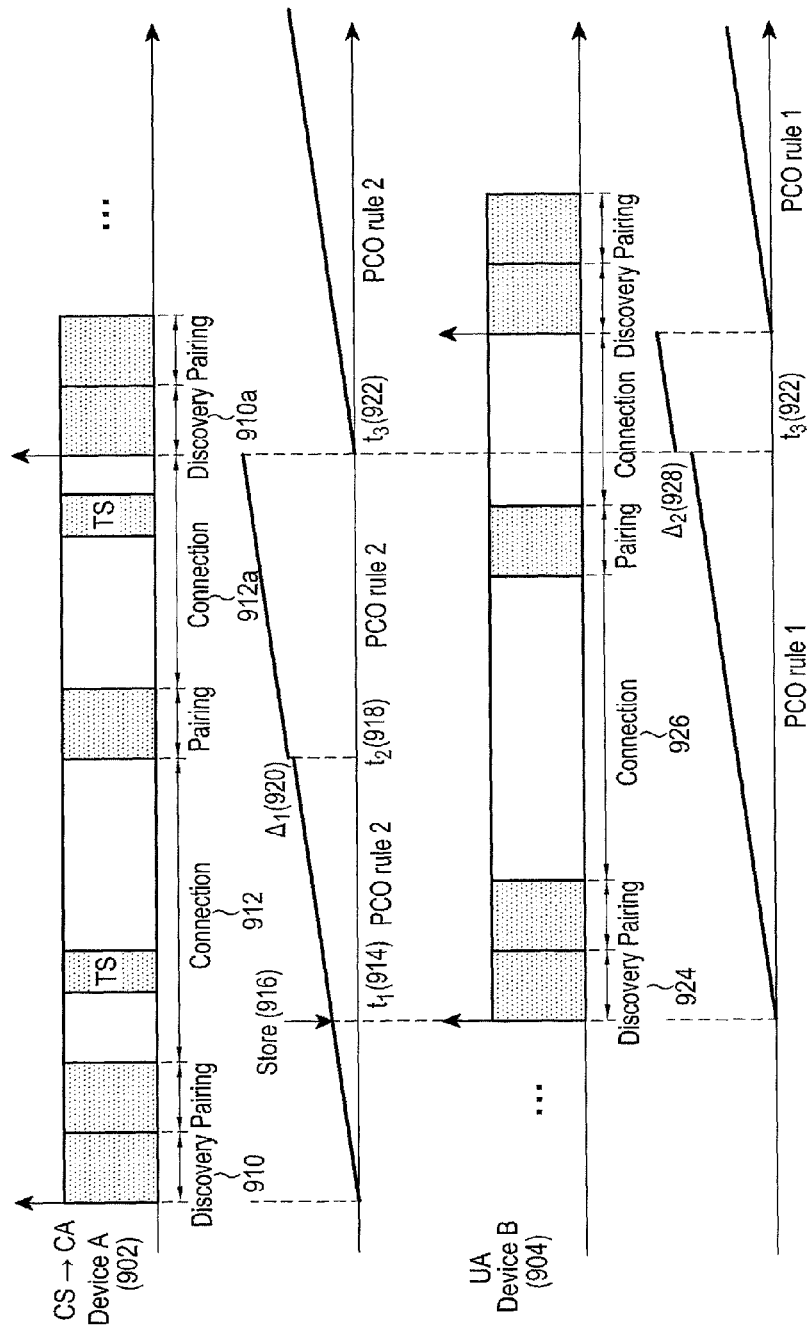
FIG. 9 illustrates another example of a synchronization operation according to embodiments of the present disclosure.

FIG. 9 illustrates another example of a synchronization operation according to embodiments of the present disclosure. The example illustrated in FIG. 9 corresponds to a case in which one frame includes a plurality of pairing periods and a plurality of connection periods. In FIG. 9, reference numeral 902 indicates a synchronization operation of device A that has transited from the CS state to the CA state and reference numeral 904 indicates a synchronization operation of device B in the UA state.

Referring to FIG. 9, the phase value of device A 902 is initialized at the start point of a discovery period 910, device A 902 starts a synchronization operation according to PCO rule 2 while entering a predetermined connection period 912, and device A 902 performs the synchronization operation according to PCO rule 2 in a plurality of connection periods 912 and 912a within the same frame. During the operation according, to PCO rule 2, device A 902 receives a synchronization signal from device B 904, which is adjacent to device A 902 and starts a discovery period 924, at a time point $t_1$ 914, and calculates and stores (as indicated by reference numeral 916) a phase adjustment value $\Delta_1$ 920 corresponding to the time point $t_1$ 914, at which the synchronization signal is received. The phase adjustment value is not instantly reflected in the phase value of the device A 902 but is reflected at the time point $t_2$ 918, at which the connection period 912 expires. In other words, at the time point $t_2$ 918 at which the connection period 912 expires, device A 902 adjusts its own phase value by the phase adjustment value 920 accumulated by at least one synchronization signal received during the connection period 912. In the next connection period 912a also, a synchronization process according to PCO rule 2 is similarly performed. At the time point $t_3$ 922, at which all the connection periods 912 and 912a within one frame expire and a next discovery period 910a starts, device A 902 initializes the phase value and transmits, i.e., broadcasts, a synchronization signal for synchronization operations of adjacent devices.

Since device B 904 is in an unconnected state, device B 904 does not perform data transmission or reception during the connection period 926 and performs a synchronization operation according to PCO rule 1. When a synchronization signal is received from device A 902 starting the discovery period 910*a* at the time point $t_3$ 922, device B 904 calculates a phase adjustment value $\Delta_2$ 928 corresponding to the time point $t_3$ 922, at which the synchronization signal is received, and instantly reflects the calculated phase adjustment value 928 in its own phase value. In other words, device B 904 adjusts its own phase value based on the calculated phase adjustment value at the time point $t_3$ 922. Although the adjustment of the phase value is actually performed through a predetermined processing, such as calculation of the phase adjustment value, after the time point $t_3$ 922, a detailed description of the processing time is omitted here.

Figure 10:
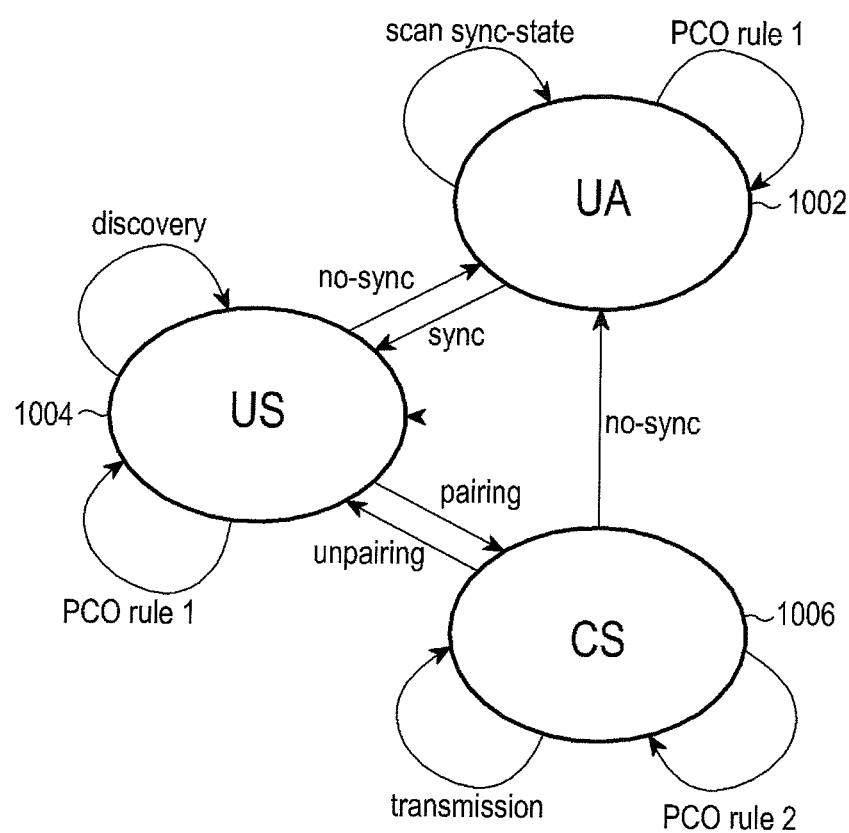
FIG. 10 illustrates a state transition in a device-to-device communication according to embodiments of the present disclosure.

FIG. 10 illustrates a state transition in a device-to-device communication according to embodiments of the present disclosure.

Referring to FIG. 10, states of a device-to-device communication include an Unconnected & Asynchronous state (UA) state 1002, an Unconnected & Synchronous state (US) state 1004, and a Connected & Synchronous state (CS) state 1006. Devices in the UA state 1002 and the US state 1004 perform synchronization operations according to PCO rule 1. Devices in the CS state 1006 perform synchronization operations according to PCO rule 2.

In the UA state 1002, a device performs a scan sync-state operation to determine whether synchronization with adjacent devices has been acquired during a predetermined time period (i.e., PCO cycle). If the device determines that synchronization with adjacent devices has been acquired, the device transitions from the UA state 1002 to the US state 1004 and performs a discovery operation. If a peer device related to the service is found through the discovery operation, the device performs a pairing operation in order to configure a connection link. When the pairing operation is completed, the device establishes connection with the peer device, transitions to the CS state 1006, and starts to perform synchronization according to PCO rule 2. In the CS state 1006, the device performs the synchronization operation according to PCO rule 2.

Whether to select the CA state can be determined by the type of the service and the degree of asynchrony in the synchronization detecting operation in the connection period.

Figure 11:
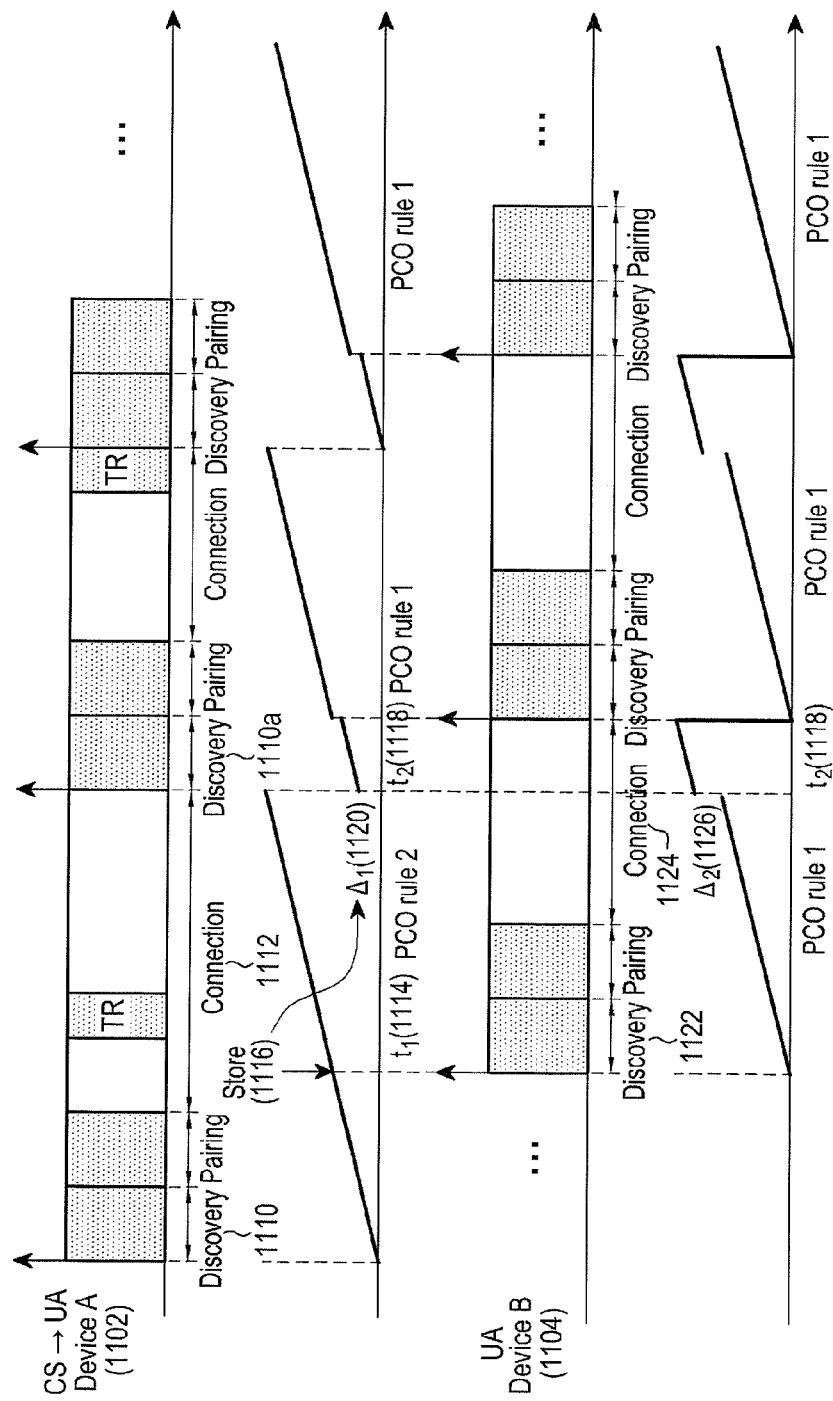
FIG. 11 illustrates an example of a synchronization operation according to embodiments of the present disclosure.

FIG. 11 illustrates an example of a synchronization operation according to embodiments of the present disclosure. In FIG. 11, reference numeral 1102 indicates a synchronization operation of device A that has transited from the CS state to the UA state and reference numeral 1104 indicates a synchronization operation of device B in the UA state.

Referring to FIG. 11, the phase value of device A 1102 is initialized at the start point of a discovery period 1110, and device A 1102 starts a synchronization operation according to PCO rule 2 while entering a predetermined connection period 1112. During the operation according to PCO rule 2, device A 1102 receives a synchronization signal from device B 1104, which is adjacent to device A 1102 and starts a discovery period 1122, at a time point $t_1$ 1114, and calculates and stores (as indicated by reference numeral 1116) a phase adjustment value $\Delta_1$ 1120 corresponding to the time point $t_1$ 1114, at which the synchronization signal is received. The phase adjustment value is not instantly reflected in the phase value of the device A 1102 but is reflected at the time point $t_2$ 1118 at which the connection period 1112 expires. In other words, at the time point $t_2$ 1118 at which the connection period 1112 expires, device A 1102 adjusts its own phase value by the phase adjustment value 1120 accumulated by at least one synchronization signal received during the connection period 1112. When a next discovery period 1110*a* starts, device A 1102 initializes the phase value and transmits, i.e., broadcasts, a synchronization signal for synchronization operations of adjacent devices.

According to certain embodiments, device A 1102 stores only information on the time point $t_1$ 1114 at which the synchronization signal is received, and collectively calculates the accumulated phase adjustment values at the time of termination of the connection period.

Since device B 1104 is in an unconnected state, device B 1104 does not perform data transmission or reception during the connection period 1124 and performs a synchronization operation according to PCO rule 1. When a synchronization signal is received from device A 1102 starting the discovery period 1110*a* at the time point $t_2$ 1118, device B 1104 calculates a phase adjustment value $\Delta_2$ 1126 corresponding to the time point $t_2$ 1118 at which the synchronization signal is received, and instantly reflects the calculated phase adjustment value in its own phase value. In other words, device B 1104 adjusts its own phase value based on the calculated phase adjustment value 1126 at the time point $t_2$ 1118.

Figure 12:
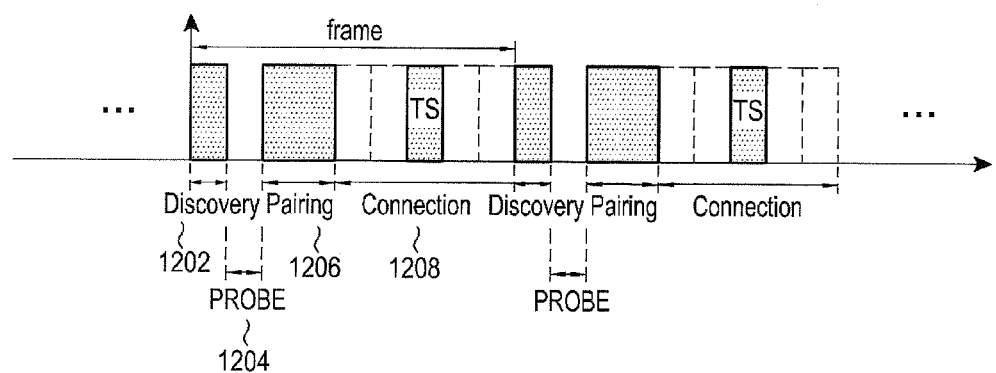
FIG. 12 illustrates a device-to-device communication process according to embodiments of the present disclosure.

FIG. 12 illustrates a device-to-device communication process according to embodiments of the present disclosure.

Referring to FIG. 12, a frame for a device-to-device communication includes a discovery period 1202, a probe period 1204, a pairing period 1206, and a connection period 1208. In the same manner, a synchronization signal is transmitted whenever the discovery period 1202 starts. The probe period 1204 is defined in order to determine whether synchronization between adjacent devices has been established, and may be located between the discovery period 1202 and the pairing period 1206. That is, when a device is asynchronous from an adjacent device to allow introduction of interference in the discovery period 1202, It is difficult for the device to exactly detect the asynchrony only by the packet error rate. Therefore, the device can detect energy or a particular signal (e.g., synchronization signal) in the probe period 1204 to determine whether to maintain the connected state or to transit to an unconnected state according to the detected energy or signal level. The location or structure of the probe period is not limited to the structure shown in FIG. 12 and can be modified in various ways according to the conditions of arrangement of periods for periodic transmission or reception before and after the probe period.

Figure 13:
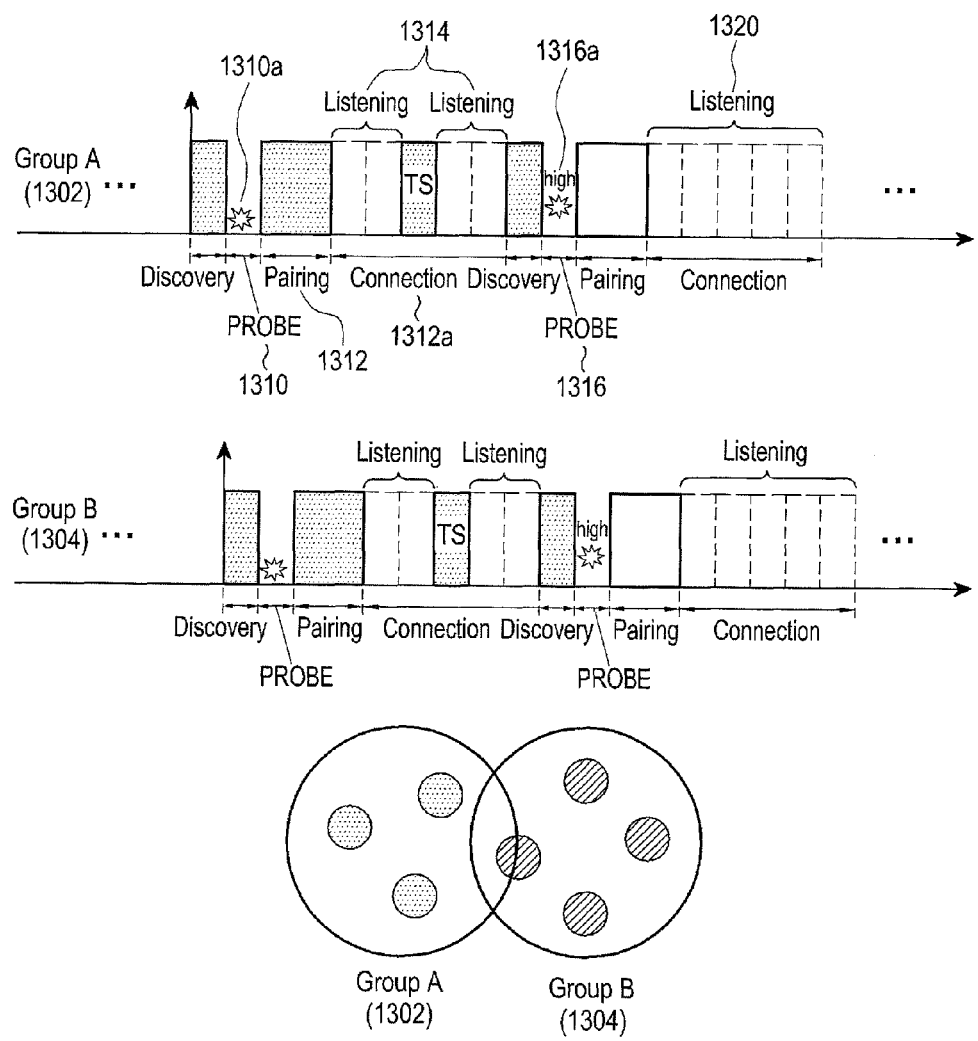
FIG. 13 illustrates an example of a synchronization operation according to embodiments of the present disclosure.

FIG. 13 illustrates an example of a synchronization operation according to embodiments of the present disclosure. In FIG. 13, reference numeral 1302 indicates a synchronization operation by each of the devices of group A and reference numeral 1304 indicates a synchronization operation by each of devices of group B.

Referring to FIG. 13, devices of group A and devices of group B have been synchronized with each other in their own group, respectively. However, group A and group B are not synchronized with each other. A device 1302 of group A detects an energy level or a synchronization signal level of adjacent devices in a probe period 1310 and determines whether the detected signal level 1310*a* corresponds to a predetermined moderate range. When the detected signal level 1310*a* corresponds to a predetermined moderate range, the device 1302 performs a pairing operation in a connected state during the following pairing period 1312, and then joins the scheduling in the following connection period 1312*a*. As a result of the scheduling, when the device fails to obtain a transmission opportunity for at least one transmission unit (e.g., traffic slot), the device 1302 performs a listening operation to try to detect a synchronization signal from adjacent devices for PCO rule 2 during the connection period 1312a.

When the signal level 1316a detected in the next probe period 1316 corresponds to a predetermined high level, that is, exceeds a predetermined upper threshold, the device 1302 directly transitions to the unconnected state without performing the pairing operation and performs a listening operation for operating according to PCO rule 1 in the following pairing and connection periods 1318 and 1318a.

Figure 14:
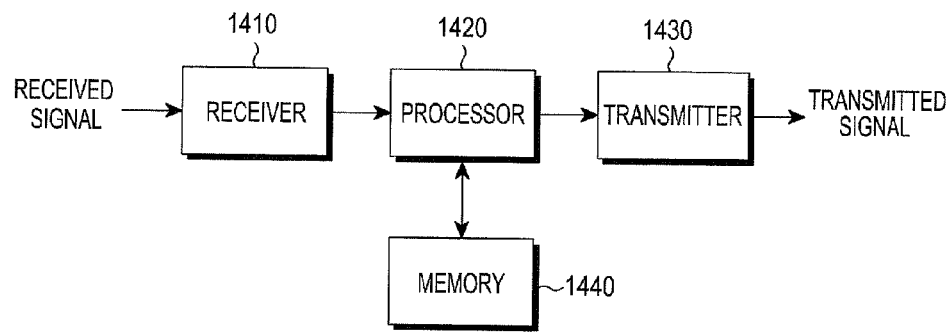
FIG. 14 illustrates a block diagram of a device performing a synchronization operation according to embodiments of the present disclosure.

FIG. 14 illustrates a block diagram of a device performing a synchronization operation according to embodiments of the present disclosure. As shown, the device includes a receiver 1410, a processor 1420, a memory 1440, and a transmitter 1430.

Referring to FIG. 14, the processor 1420 is configured to control the receiver 1410 and the transmitter 1430 according to the state for a device-to-device communication. The receiver 1410 is configured to receive and detect a synchronization signal from at least one adjacent device, and the transmitter 1430 is configured to transmit a synchronization signal according to a command from the processor.

The processor 1420 controls the transmitter 1430 to transmit a synchronization signal when a phase value reaches a predetermined maximum value while increasing the phase value or an internal reference time according to a predetermined phase increment ratio, adjusts the phase value according to a synchronization signal detected by the receiver 1410, and transmits a synchronization signal through the transmitter 1430 when the phase value reaches the predetermined maximum value. The adjustment of the phase value is performed according to PCO rule 2 when the device is in a connected state among the state for the device-to-device communication and performed according to PCO rule 1 when the device is in an unconnected state.

Figure 15:
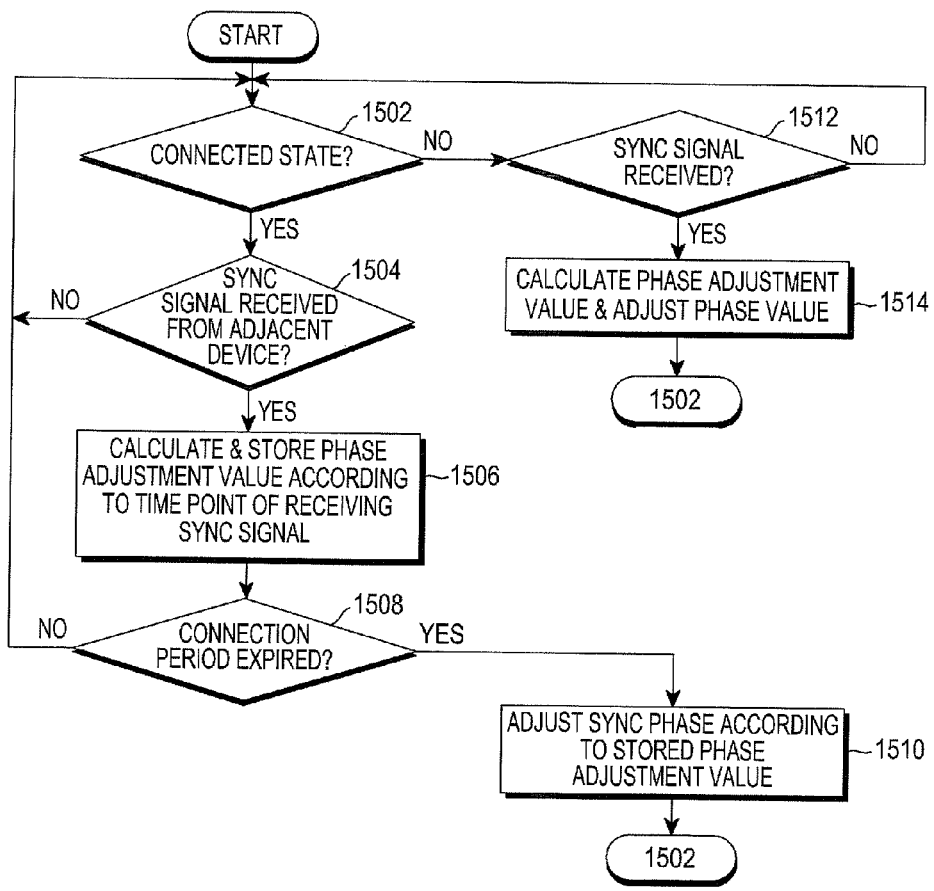
FIG. 15 illustrates a flowchart of a synchronization operation in a connected state according to embodiments of the present disclosure.

FIG. 15 illustrates a method of a synchronization operation in a connected state according to embodiments of the present disclosure. That is, FIG. 15 illustrates a detailed process of a synchronization operation according to PCO rule 2.

Referring to FIG. 15, in block 1502, a device determines whether it is currently in a connected state. When the device is currently in a connected state, the device proceeds to block 1504 and performs a synchronization process according to PCO rule 2. In block 1504, the device monitors if a synchronization signal from another device is received. When a synchronization signal has been received, the device calculates and stores a phase adjustment value according to a predetermined adjustment function and a phase value at the time point when the synchronization signal is received, in block 1506. In block 1508, the device determines whether the connection period has expired. When the connection period has not expired, the device returns to block 1502 in which the device keeps on listening for a synchronization signal from another device. When the connection period has expired, the device adjusts the phase value according to a sum of all the stored phase adjustment values in block 1510, and then returns to block 1502.

As a result of the determination in block 1502, when the device is currently not in a connected state, the device proceeds to block 1512 in which the device monitors a synchronization signal from another device in order to operate according to PCO rule 1. When a synchronization signal has been received, the device calculates a phase adjustment value according to a predetermined adjustment function and a phase value at the time point when the synchronization signal is received, adjusts the current phase value based on the phase adjustment value in block 1514, and then returns to block 1502.

Figure 16A:
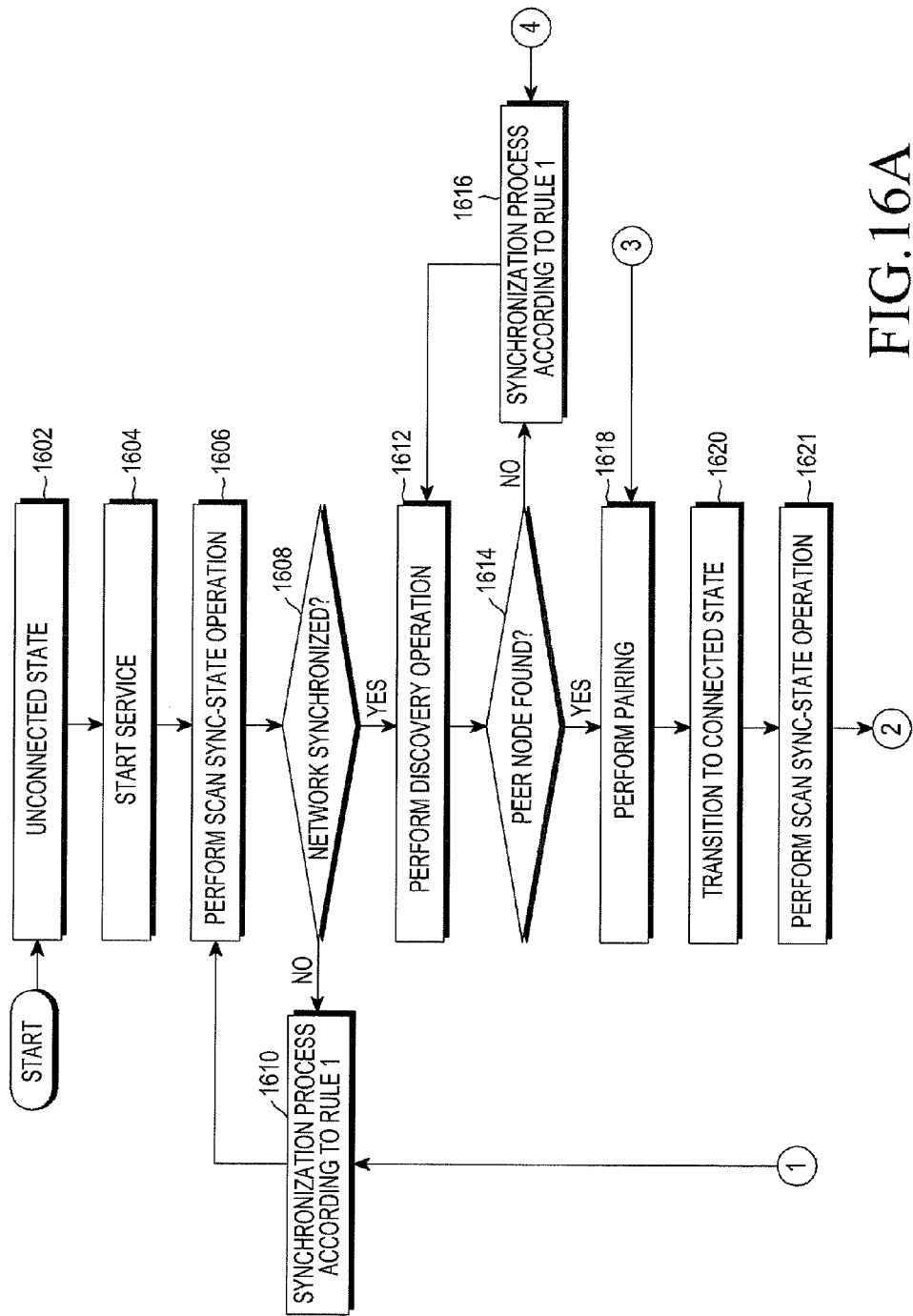
FIGS. 16A and 16B illustrate a process of a transition operation by a synchronization rule according to embodiments of the present disclosure.
Figure 16B:
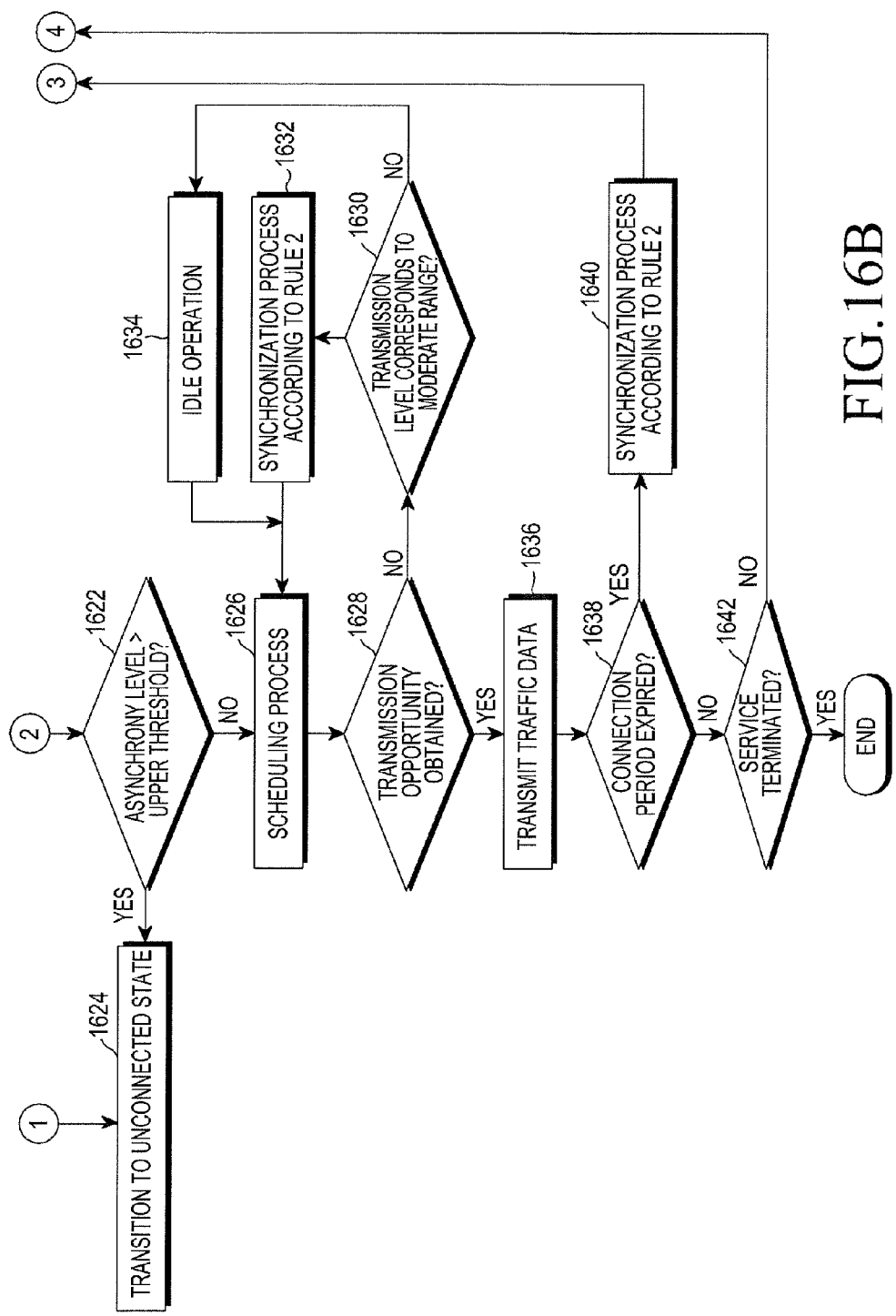

FIGS. 16A and 16B illustrate a method of a transition operation by a synchronization rule according to embodiments of the present disclosure. That is, in the present embodiment described below, a device performs a synchronization operation according to PCO rule 2 when it fails to obtain a transmission opportunity as a result of scheduling. Further, when the asynchrony level corresponds to a dangerously high level, the device transitions to an unconnected state and performs a listening operation in order to operate according to PCO rule 1.

Referring to FIG. 16A, the device starts an operation in an unconnected state in block 1602, and starts a service by detecting data to be transmitted or received in block 1604. In block 1606, the device performs a scan sync-state operation to determine whether synchronization with adjacent devices has been acquired. In block 1608, the device determines whether synchronization with adjacent devices has been acquired, that is, whether the device-to-device (D2D) communication network has been synchronized. When the network has not been synchronized, the device performs a synchronization operation according to PCO rule 1 in block 1610 and then returns to block 1606 in order to determine whether the synchronization has been acquired. In contrast, when the network has been synchronized, the device proceeds to block 1612.

In block 1612, the device broadcasts information related to the service during a discovery period and tries to detect related information from other devices. In block 1614, the device determines whether there exists a peer device found through the discovery operation during the discovery period. When no peer device has been found, the device performs a synchronization operation according to PCO rule 1 in block 1616 and then returns to block 1612 in order to wait for the next discovery period. In contrast, when a peer device has been found through the discovery operation, the device proceeds to block 1618 in which the device makes a pair with the found peer device. Then, the device transitions to a connected state in block 1620 and then detects an asynchronous level by performing a scan sync-state operation (or probe sync-state operation) in block 1621.

In block 1622, the device determines whether the signal level (asynchrony level) of the adjacent devices detected in the probe period exceeds an upper threshold. When the signal level exceeds the upper threshold, the device proceeds to block 1624 in which the device transitions to the unconnected state. Then, in block 1610, the device performs a synchronization operation according to PCO rule 1. In contrast, when the asynchrony level is not high, that is, when the asynchrony level does not exceed the upper threshold, the device joins the scheduling process in block 1626 to determine whether it has obtained a transmission opportunity at the current transmission unit time point among a plurality of consecutive transmission units, in block 1628. When the device has not obtained a transmission opportunity, the device determines whether the asynchrony level detected in block 1621 corresponds to a predetermined moderate range, in block 1630. When the detected asynchrony level corresponds to a predetermined moderate range, the device performs a synchronization operation according to PCO rule 2 in block 1632. In contrast, when the detected asynchrony level does not correspond to the moderate range, the device maintains the idle state during the corresponding transmission unit in block 1634.

As a result of the determination in block 1628, when a transmission opportunity for one transmission unit has been allocated, the device transmits traffic data during the allocated transmission opportunity in block 1636. Then, after transmitting traffic data for a plurality of consecutive transmission units, the device determines whether the current connection period has expired. When the current connection period has expired, the device maintains the synchronization operation according to PCO rule 2 in block 1640 and then returns to block 1618. When the current connection period has not expired and the current service is not terminated as a result of determination in block 1642, the device returns to block 1616 in order to perform a synchronization operation according to PCO rule 1.

Although the present disclosure has been described with embodiments, various changes and modifications may be suggested to one skilled in the art. It is intended that the present disclosure encompass such changes and modifications as fall within the scope of the appended claims.

What is claimed is:

1. A method of synchronization for a device-to-device communication, the method comprising:
   detecting, by a device, at least one synchronization signal transmitted from at least one adjacent device in a connected state;
   accumulating at least one phase adjustment value according to a time point when the at least one synchronization signal is received; and
   in response to transitioning from the connected state to an unconnected state, adjusting a synchronization phase value according to the accumulated phase adjustment value.

2. The method of claim 1, wherein the device and the at least one adjacent device comprise oscillators having an identical phase increment ratio, respectively.

3. The method of claim 1, further comprising:
   in response to at least one of an expiration of a predetermined connection period and a detection of an asynchrony, transiting the device from the connected state to the unconnected state.

4. The method of claim 3, further comprising:
   determining that an asynchrony has been detected in response to detecting at least one of:
   at least one synchronization signal from adjacent devices in a predetermined oscillation cycle within a scanning period in which the device operates without transmitting a synchronization signal, and
   at least two synchronization signals from adjacent devices within the predetermined oscillation cycle in a synchronization process in which the device operates while transmitting a synchronization signal.

5. The method of claim 1, further comprising:
   in response to a signal level detected from adjacent devices in the connected state exceeding a predetermined threshold, transiting to the unconnected state without performing a pairing operation.

6. The method of claim 1, further comprising:
   in response to a signal level detected from adjacent devices in the connected state corresponding to a predetermined moderate range, performing a pairing in a pairing period and joining a scheduling in a connection period following the pairing period; and
   in response to a failure of the device to obtain a transmission opportunity for at least one transmission unit as a result of the scheduling, starting to store the at least one phase adjustment value.

7. An apparatus for synchronization for a device-to-device communication, the apparatus comprising:
   a receiver configured to detect at least one synchronization signal transmitted from at least one adjacent device;
   a transmitter configured to transmit a synchronization signal in response to a synchronization phase value reaching a predetermined maximum value; and
   a processor configured to:
   accumulate at least one phase adjustment value according to a time point when the at least one synchronization signal is received when the synchronization signal is received in a connected state, and
   adjust the synchronization phase value according to the accumulated phase adjustment value in response to transitioning from the connected state to a unconnected state.

8. The apparatus of claim 7, further comprising oscillators, and
   wherein the apparatus and the at least one adjacent device comprise oscillators having an identical phase increment ratio, respectively.

9. The apparatus of claim 7, wherein the processor is further configured to: in response to at least one of an expiration of a predetermined connection period and a detection of an asynchrony, transition from the connected state to the unconnected state.

10. The apparatus of claim 9, wherein, the processor is further configured to determine that an asynchrony has been detected in response to detecting at least one of:
    at least one synchronization signal from adjacent devices in a predetermined oscillation cycle within a scanning period in which the apparatus operates without transmitting a synchronization signal, and
    at least two synchronization signals from adjacent devices are detected within the predetermined oscillation cycle in a synchronization process in which the device operates while transmitting a synchronization signal.

11. The apparatus of claim 7, wherein the processor is further configured to: in response to detecting a signal level from adjacent devices in the connected state exceeds a predetermined threshold, transition to the unconnected state without performing a pairing operation.

12. The apparatus of claim 7, wherein the processor is configured to:
    perform a pairing in a pairing period, and
    join a scheduling in a connection period following the pairing period in response to detecting a signal level from adjacent devices in the connected state corresponds to a predetermined moderate range, and
    store the at least one phase adjustment value in response to a failure to obtain a transmission opportunity for at least one transmission unit as a result of the scheduling.

13. A wireless communication system for synchronization for a device-to-device communication, the system comprising:
    a first device comprising:
    a receiver configured to detect at least one synchronization signal transmitted from at least one adjacent device;
    a transmitter configured to transmit a synchronization signal in response to a synchronization phase value reaching a predetermined value; and
    a processor configured to:
    accumulate at least one phase adjustment value according to a time point when the at least one synchronization signal is received when the synchronization signal is received in a connected state, and adjust the synchronization phase value according to the accumulated phase adjustment value in response to transitioning from the connected state to an unconnected state.

14. The wireless communication system of claim 13, wherein the first device and the at least one adjacent device comprise oscillators having an identical phase increment ratio, respectively.

15. The wireless communication system of claim 13, wherein the first device is further configured to: in response to at least one of an expiration of a predetermined connection period and a detection of an asynchrony, transition from the connected state to the unconnected state.

16. The wireless communication system of claim 15, wherein, the first device is further configured to determine that an asynchrony has been detected in response to detecting at least one of:
    at least one synchronization signal from adjacent devices in a predetermined oscillation cycle within a scanning period in which the first device operates without transmitting a synchronization signal, and
    at least two synchronization signals from adjacent devices are detected within the predetermined oscillation cycle in a synchronization process in which the first device operates while transmitting a synchronization signal.

17. The wireless communication system of claim 13, wherein the first device is further configured to: in response to detecting a signal level from adjacent devices in the connected state exceeds a predetermined threshold, transition to the unconnected state without performing a pairing operation.

18. The wireless communication system of claim 13, wherein the first device is configured to:
    perform a pairing in a pairing period, and
    join a scheduling in a connection period following the pairing period in response to detecting a signal level from adjacent devices m the connected state corresponds to a predetermined moderate range, and
    store the at least one phase adjustment value in response to a failure to obtain a transmission opportunity for at least one transmission unit as a result of the scheduling.

19. The wireless communication system of claim 18, wherein in the pairing period, the first device selects to communicate with an adjacent device that has transmitted information to which the first device pays attention during a discovery period, as a selected adjacent device, transmits an intention to link to the selected adjacent device as a pair, and makes a pair with the selected adjacent device according to a response of the selected adjacent device.

20. The wireless communication system of claim 19, during the connection period, the first device transmits and receives data through one or more traffic slots between the first device and paired selected adjacent device.

* * * * *